United States Patent Office 3,018,180
Patented Jan. 23, 1962

3,018,180
GELATIN FOOD PRODUCT
Robert M. Lauck and Arthur Dock Fon Toy, Park Forest, Ill., assignors to Victor Chemical Works, Chicago, Ill., a corporation of Illinois
No Drawing. Filed Nov. 3, 1959, Ser. No. 850,544
5 Claims. (Cl. 99—130)

This invention relates to gelatin food products of the type commonly known as gelatin desserts and marketed as a dry powder to be dissolved in water. More particularly, the invention relates to gelatin products of this type which have improved stability in storage and which dissolve in relatively cool water.

Gelatin food products of the "gelatin dessert" type typically comprise gelatin powder, a sweetening agent such as sugar, and an acidulating agent used to control the acidity and other characteristics of the product. Citric, tartaric, adipic, lactic, phosphoric and fumaric acids have been proposed as suitable acidulents for use in gelatin products. Citric acid, particularly, has been widely used in the commercial production of gelatin products. While such gelatin compositions have been widely accepted for use in the making of gelatin desserts and the like, there is a need for improvement in the stability of the dry gelatin mix during long periods of storage. Also, there is a need for a type of gelatin mix which does not require the use of hot water for dissolving the mix in the preparation of the gelled type of food preparations.

It has now been found that by the substitution of phenylphosphonic acid for the acidulent normally used in gelatin mixes, there can be produced a more rapidly soluble gelatin mix which in its dry form is non-hygroscopic and more highly stable against deterioration and moisture pickup under more severe storage conditions than the presently known gelatin mixes.

The gelatin mixes contemplated by this invention are those which are intended to be used in the preparation of edible gels of various formulations including gelatin, a sweetening agent and an acid constituent. If desired, various flavoring agents, buffer salts, etc., may be included in the mixes to facilitate the preparation of a variety of gelatin-type desserts. Proportions of the various ingredients may be varied to obtain different degrees of sweetness, gel stiffness, taste, tartness, etc.

In a typical prior art gelatin dessert as disclosed in U.S. Patent No. 2,819,971, a mixture of 10 grams of gelatin, 75 grams of sucrose, 0.43 gram of a buffer salt mixture (50–50 mix of mono- and disodium phosphates) and 2.48 grams of citric acid represents a dry mix unit capable of producing a typical gel product on solution in 473 ml. of hot water and allowing the solution to cool. Small amounts of fruit flavors and coloring agents are generally included in such formulations.

In order to illustrate the present invention, a series of tests was carried out utilizing the above-described formulation, with the substitution of phenylphosphonic acid for citric acid as the acidulating agent. Determination of the pH values and tartness of the resulting gels using different amounts of phenylphosphonic acid are shown in the following table.

Table I

| Mix No. | Acidulent | pH | Flavor |
|---|---|---|---|
| 1 | 2.48 g. Citric acid (Control) (.0129 mol). | 3.30 | Tart, pleasing. |
| 2 | 1.05 g. Phenylphosphonic acid | 3.80 | Bland, sweet. |
| 3 | 1.89 g. Phenylphosphonic acid | 2.81 | Bland. |
| 4 | 2.10 g. Phenylphosphonic acid | 2.65 | Slightly bland. |
| 5 | 2.30 g. Phenylphosphonic acid (.0145 mol). | 2.59 | Tart, pleasing. |
| 6 | 2.52 g. Phenylphosphonic acid | 2.49 | Slightly acid. |

The above tests show that optimum flavor is obtained at a pH value of about 2.6 when using phenylphosphonic acid, compared to a pH value of 3.30 when citric acid is employed, while the acidic hydrogen in the phenylphosphonic acid required is only about 76% of that present in the citric acid used. The data also show that the phenylphosphonic acid content may be considerably reduced in amount and still give gelatin desserts having desirable taste characteristics. For example, a gelatin product containing only 1.05 grams of phenylphosphonic acid and having a pH value of 3.80 was quite acceptable.

The gelatin mixes of the invention containing phenylphosphonic acid have improved stability against hydration and caking on storage in humid atmospheres. For example, mixes corresponding to No. 1 and No. 3 of Table I were stored for 24 hours at 90° F. in an atmosphere of 75% relative humidity. The mix containing citric acid showed moisture pickup of 3.8% by weight, had a pH value of 3.39, and showed a marked red discoloration, whereas the mix containing 1.89 grams of phenylphosphonic acid had a moisture pickup of only 1.9% by weight, a pH value of 3.11, and showed only a slight discoloration. The phenylphosphonic acid-containing mix remained non-caked and free-flowing.

The phenylphosphonic acid-containing mixes of the invention have, in addition, higher heat stability than citric acid-containing mixes. For example, on heating the dry mixes in sealed containers at 140° F. the citric acid-containing mixes showed a pronounced brown discoloration, whereas the phenylphosphonic acid-containing mixes showed no discoloration.

It has been found that the use of a small amount of monosodium phosphate in conjunction with the phenylphosphonic acid in the gelatin products of the invention improves the taste or "tang" thereof. The monosodium phosphate may be conveniently mixed with the phenylphosphonic acid in an amount of about 0.1% to about 30% by weight of the mixture. The improved results attributable to the addition of monosodium phosphate in a typical gelatin product are illustrated in Table II, which gives the evaluation of the taste of the gelled products by a taste panel. In each case a base mix similar to that described for the data of Table I above was used, together with the acidulents noted.

Table II

| Acidulent Mixture No. | Composition of Acidulent | Percent Monosodium Phosphate in Acidulent, by Weight | pH | Flavor |
|---|---|---|---|---|
| 1 | 1.57 g. Phenylphosphonic acid. | 0 | 2.53 | Slightly bland. |
| 2 | 1.57 g. Phenylphosphonic acid, 0.1 g. Monosodium Phosphate. | 6 | 2.58 | Very slightly bland. |
| 3 | 1.57 g. Phenylphosphonic acid, 0.21 g. Monosodium Phosphate. | 12 | 2.67 | Very slightly tart. |
| 4 | 1.57 g. Phenylphosphonic acid, 0.32 g. Monosodium Phosphate. | 17 | 2.72 | Slightly tart. |
| 5 | 1.57 g. Phenylphosphonic acid, 0.42 g. Monosodium Phosphate. | 21 | 2.77 | Do. |

Any of the various types of commercial edible gelatins may be used in formulating the mixes of the invention, it being only necessary to take into consideration the acidity of the gelatin when incorporating the phenylphosphonic acid so as to give the gel produced from such mix a pH value within the range of about 2.5 to 3.8, and preferably about 2.6.

Mixtures of citric acid and phenylphosphonic acid may be used, if desired, as acidulents in the gelatin mixes with the proportionate advantages of the phenylphosphonic acid being obtained.

As noted above, the principle advantages in the use of phenylphosphonic acid as an acidulent in dry gelatin mix formulations suitable for the preparation of gelled-type desserts are increased stability of the dry mix against discoloration, moisture pickup and caking on storage at higher humidities and temperatures than is possible with the known commercial mixes containing citric acid or other type fruit acids. A further advantage in the use of phenylphosphonic acid is in the more rapid solubility of the mixes in water at room temperatures. For example, mixes containing phenylphosphonic acid are rapidly soluble in water at 70° F. whereas mixes containing citric, fumaric, and the like acids require the use of water at about 150–160° F. for satisfactory solution.

The foregoing detailed description has been given for clearness of understanding only, and no unnecessary limitations should be understood therefrom, as modifications will be obvious to those skilled in the art.

What is claimed is:
1. A gelatin food product containing phenylphosphonic acid as an acidulent.
2. A gelatin food product comprising gelatin, a sweetening agent and phenylphosphonic acid.
3. A gelatin dessert mixture comprising an edible gelatin, sugar, phenylphosphonic acid and a flavoring agent.
4. The dessert mixture of claim 3 which contains a sufficient quantity of phenylphosphonic acid to give a pH of about 2.5 to 3.8 when said mixture is dissolved in water to form a gelable solution.
5. The dessert mixture of claim 3 which includes as an additional ingredient monosodium phosphate in an amount not more than 30% by weight, based on the combined weights of said phenylphosphonic acid and said monosodium phosphate.

References Cited in the file of this patent
UNITED STATES PATENTS

| | | |
|---|---|---|
| 2,196,300 | Grettie | Apr. 9, 1940 |
| 2,412,305 | Stokes | Dec. 10, 1946 |
| 2,477,539 | Grettie et al. | July 26, 1949 |